(12) United States Patent
Yoneyama et al.

(10) Patent No.: US 7,118,394 B2
(45) Date of Patent: Oct. 10, 2006

(54) CARD CONNECTOR

(75) Inventors: Kazuo Yoneyama, Uji (JP); Tomoyuki Sakiyama, Uji (JP); Noboru Wakitani, Hirakata (JP); Tsushima Takada, Uji (JP); Hirokazu Mori, Ikoma (JP)

(73) Assignees: Nintendo Co., Ltd., Kyoto (JP); Hosiden Corporation, Osaka (JP)

( * ) Notice: Subject to any disclaimer, the term of this patent is extended or adjusted under 35 U.S.C. 154(b) by 0 days.

(21) Appl. No.: 10/531,913

(22) PCT Filed: Sep. 3, 2004

(86) PCT No.: PCT/JP2004/012831

§ 371 (c)(1),
(2), (4) Date: Apr. 19, 2005

(87) PCT Pub. No.: WO2005/034295

PCT Pub. Date: Apr. 14, 2005

(65) Prior Publication Data

US 2005/0272290 A1 Dec. 8, 2005

(30) Foreign Application Priority Data

Oct. 6, 2003 (JP) .............................. 2003-347009

(51) Int. Cl.
*H01R 13/62* (2006.01)
(52) U.S. Cl. ...................................... 439/159; 439/630
(58) Field of Classification Search ................ 439/159, 439/630, 325
See application file for complete search history.

(56) References Cited

U.S. PATENT DOCUMENTS

| | | | |
|---|---|---|---|
| 6,315,583 B1 | 11/2001 | Nishioka | |
| 6,398,567 B1* | 6/2002 | Nishimura | 439/159 |
| 6,482,020 B1* | 11/2002 | Yeh | 439/159 |
| 6,663,403 B1* | 12/2003 | Hsu | 439/159 |
| 2001/0008813 A1 | 7/2001 | Nishioka | |
| 2001/0012712 A1* | 8/2001 | Nishioka | 439/159 |
| 2002/0004327 A1* | 1/2002 | Nishioka | 439/159 |

(Continued)

FOREIGN PATENT DOCUMENTS

JP 2001-085089 3/2001

(Continued)

OTHER PUBLICATIONS

Copy of European Search Report dated Apr. 13, 2006, 3 pages.

*Primary Examiner*—Tulsidas C. Patel
*Assistant Examiner*—Vladimir Imas
(74) *Attorney, Agent, or Firm*—Armstrong, Kratz, Quintos, Hanson & Brooks, LLP

(57) ABSTRACT

A card connector which prevents a card from popping out when the card is discharged and is not easily broken. The card connector includes a base having a slot into which a card can be inserted, a slider which is provided at a position in the base to be abuttable on the card and which can be caused to slide, a spring forcing the slider in the discharging direction of the card, and a lock spring including a plate spring having a tip end engageable with an engagement recess of the card and a base end mounted on the slider. The tip end can be displaced in a direction away from the card, and base is provided with a first rib which abuts on the tip end of the lock spring to prevent the tip end from being displaced when the slider is positioned at the card pop-out preventing position.

4 Claims, 10 Drawing Sheets

U.S. PATENT DOCUMENTS

| | | | |
|---|---|---|---|
| 2002/0037658 A1* | 3/2002 | Ozawa | 439/159 |
| 2003/0096521 A1* | 5/2003 | Kikuchi et al. | 439/159 |
| 2003/0194897 A1* | 10/2003 | Nishioka | 439/325 |
| 2004/0009691 A1* | 1/2004 | Chang | 439/159 |
| 2004/0014342 A1* | 1/2004 | Yu et al. | 439/159 |

FOREIGN PATENT DOCUMENTS

| | | |
|---|---|---|
| JP | 2001-118633 | 4/2001 |
| JP | 2002-134224 | 5/2002 |

* cited by examiner (a)

(b)

CARD CONNECTOR

BACKGROUND OF THE INVENTION

1. Field of the Invention

The present invention relates to a card connector into which a card such as an SD (Secure Digital) memory card is inserted.

2. Description of the Related Art

As this kind of card connector, there is one in which a heart cam mechanism which locks the inserted card at a card insertion position and at a card discharging position is provided on an inner wall of a base having a slot (patent document 1) and one which comprises an elastic lock member which engages with an engagement recess formed on a side face of the card at a card insertion position (patent document 2).

Such a card connector is formed such that a part of the card pops out of the slot so that a user can easily take out the card when the card is discharged.

Patent document 1: Japanese Unexamined Patent Publication No. 2001-85089

Patent document 2: Japanese Unexamined Patent Publication No. 2002-134224

SUMMARY OF THE INVENTION

In the above card connector, a spring is used as means for discharging the card. Therefore, there are problems, for example, when the card is discharged, the card pops out of the slot by inertia force applied to the card and the card could be lost or cause injury to the users face.

In addition, although the card is prevented from popping out using friction in the conventional card connector, there is another problem in which the connector is easily damaged because of the friction.

The present invention was made in view of the above problems and it is an object of the present invention to provide a card connector which can prevent the card from popping out when the card is discharged and is not easily damaged.

In order to solve the above problems, the present invention provides a card connector into which a card having an engagement recess on at least one side face is inserted comprising a base having a slot into which the card can be inserted, a slider provided at a position in the base to be abuttable on the card, a spring forcing the slider in the discharging direction of the card; and a lock spring comprising a plate spring having a tip end engageable with the engagement recess of the card and a base end mounted on the slider, the tip end displaceable in a direction away from the card. In the card connector of the present invention, the slider is pushed by the inserted card and thereby moves in accordance with the card from a card discharging position to a card insertion position against an urging force of the spring while, when the card is discharged, the slider moves in accordance with the card by the urging force of the spring from the card insertion position to a card pop-out preventing position beyond the card discharging position, and the base is provided with a first rib which abuts on the tip end of the lock spring to prevent the tip end from being displaced when the slider is positioned at the card pop-out preventing position.

The base is also provided with a second rib which abuts on the tip end of the lock spring to prevent the tip end from being moved when the slider is positioned at the card insertion position.

Furthermore, the base is provided with an elastic member which abuts on a tip end of the slider to return the slider from the card pop-out preventing position to the card discharging position when the slider is positioned at the card pop-out preventing position.

The tip end of the lock spring can be elastically deformed so as to disengage from the engagement recess of the card when it abuts on at least the first rib.

In the case of the card connector of the present invention, when the card is discharged, the slider is moved to the card pop-out preventing position by the urging force of the spring, and when the slider is positioned at the card pop-out preventing position, the tip end of the lock spring abuts on the first rib provided in the base so that it is prevented from being moved in the direction away from the card. Therefore, the state in which the tip end of the lock spring engages with the engagement recess of the card is maintained and the card can be prevented from popping out. As a result, the card is not lost or does not injure the user's face because the card does not pop out when the card is discharged unlike the conventional example. In addition, because friction is not used to prevent the card from popping out unlike the conventional example, the connector itself is not easily damaged.

In the case of the card connector of the present invention, when the slider is positioned at the card insertion position, the tip end of the lock spring abuts on the second rib provided in the base and it is prevented from being moved. Therefore, the state in which the tip end of the lock spring engages with the engagement recess of the card is maintained and the inserted card cannot be forcedly pulled out. As a result, the card connector can be prevented from being damaged because the card is not forcedly pulled out.

In the case of the card connector of the present invention, when the slider is positioned at the card pop-out preventing position, it abuts on the elastic member provided in the base and it is returned from the card pop-out preventing position to the card discharging position. As a result, a situation in which the card cannot be taken out because the slider is still positioned at the card pop-out preventing position can be avoided.

In the case of the card connector of the present invention, the tip end of the lock spring can be elastically deformed so as to disengage from the engagement recess of the card while it abuts on at least the first rib. As a result, even if the card cannot be appropriately discharged because of malfunction, the card can be taken out.

DETAILED DESCRIPTION OF EXEMPLARY EMBODIMENTS

Embodiments of the present invention will be described hereinafter.

Figure 1:
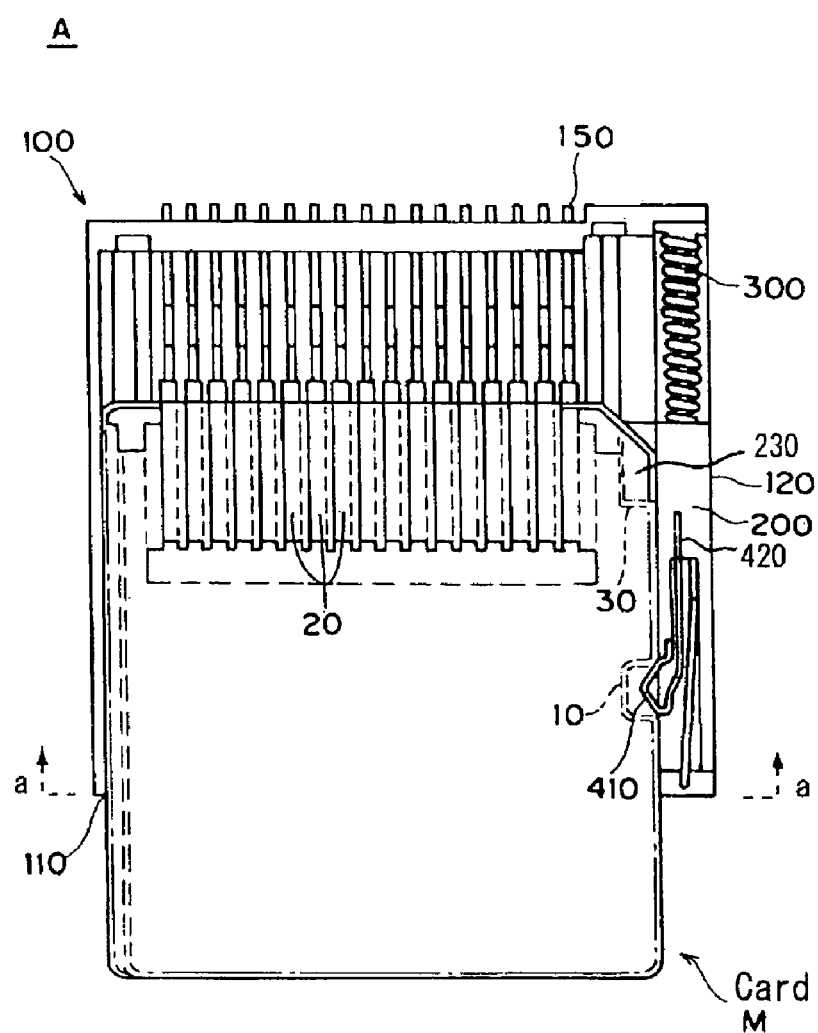
FIG. 1 is a schematic plan view showing a card connector in which its inside is transparent according to an embodiment of the present invention.

First, a card connector according to a first embodiment of the present invention will be described with reference to the drawings. FIG. 1 is a schematic plan view showing a card connector in which its inside is transparent according to the embodiment 1 of the present invention, FIG. 2 is a sectional view showing the card connector taken along line a—a when a slider is positioned at a card discharging position, FIG. 3 is a sectional view showing the card connector taken along line a—a when the slider is positioned at a card insertion position, FIG. 4 is a sectional view showing the card connector taken along line a—a when the slider is positioned at a card pop-out preventing position, and FIG. 5 is a view for explaining the slider of the card connector, in which (a) is a schematic perspective view showing the slider taken from beneath and (b) is a schematic perspective view showing the slider taken from above.

Figure 2:
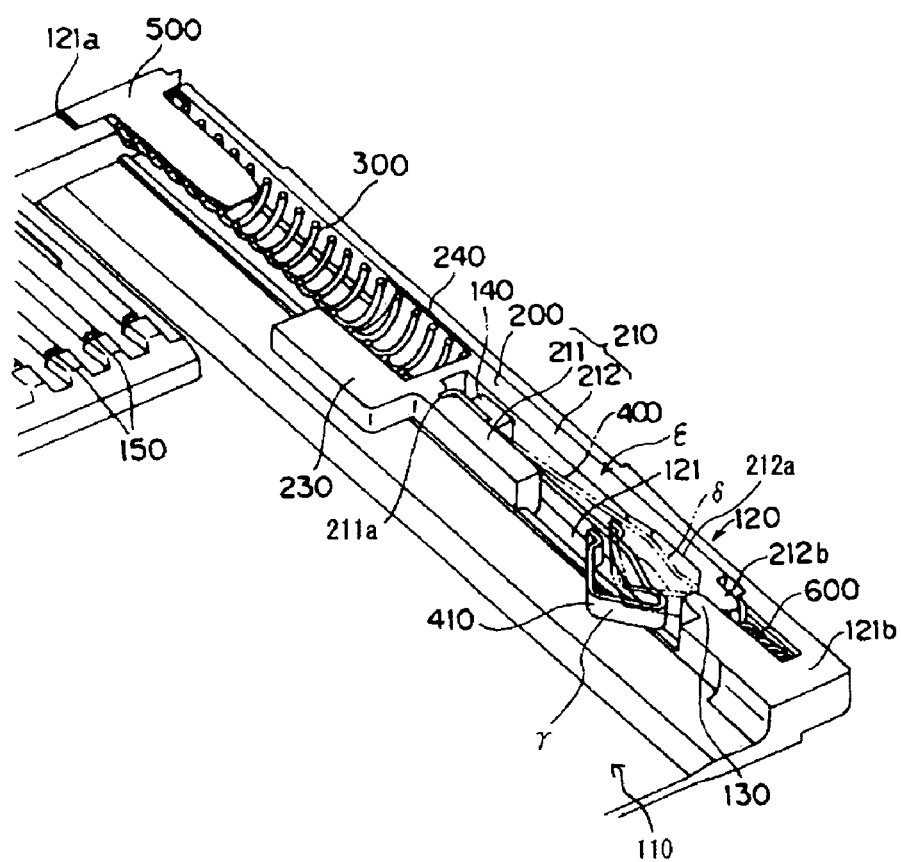
FIG. 2 is a sectional view showing the card connector taken along line a—a when a slider is positioned at a card discharging position.

A card connector A shown in FIGS. 1 and 2 is a connector to which a card M having an engagement recess 10 on one side face is inserted, and it comprises a base 100 having a slot 110 to which the card M can be inserted, a slider 200 provided at a position on which the card can abut in the base 100, a spring 300 which forces the slider 200 in the card discharging direction, and a lock spring 400 which is a plate spring in which a tip end 410 can engage with the engagement recess 10 of the card M and a base end 420 is mounted on the slider 200, and the tip end 410 can be moved in the direction away from the card M. Hereinafter, each part will be described in detail. In addition, the card M described here has a plurality of contact parts 20 at an end face, and a recess 30 is provided at a position on which the slider 200 abuts.

Figure 3:
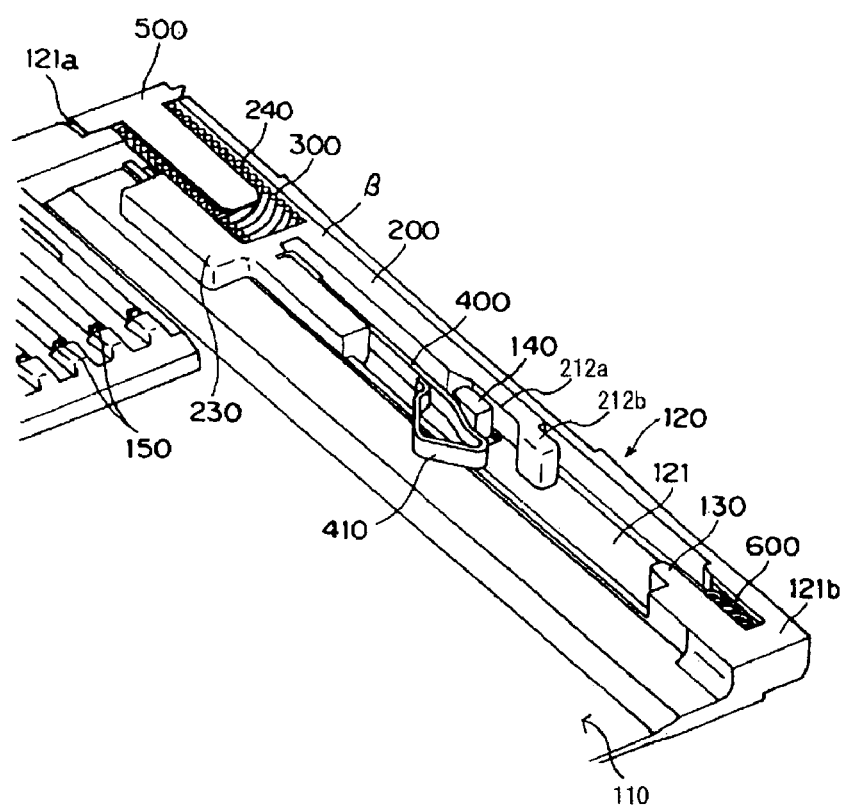
FIG. 3 is a sectional view showing the card connector taken along line a—a when the slider is positioned at a card insertion position.
Figure 4:
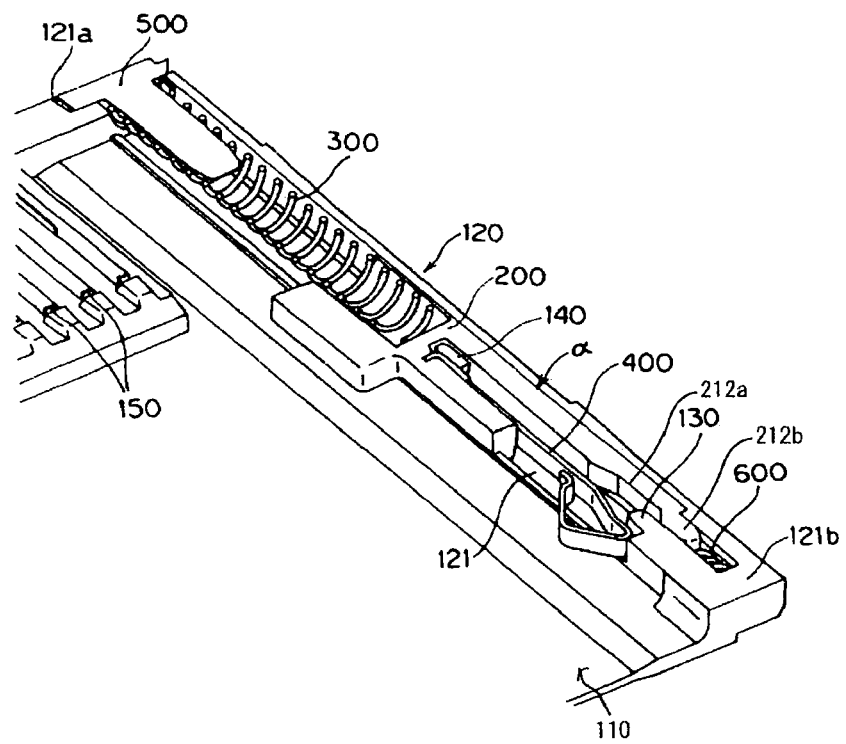
FIG. 4 is a sectional view showing the card connector taken along line a—a when the slider is positioned at a card pop-out preventing position.
Figure 5:
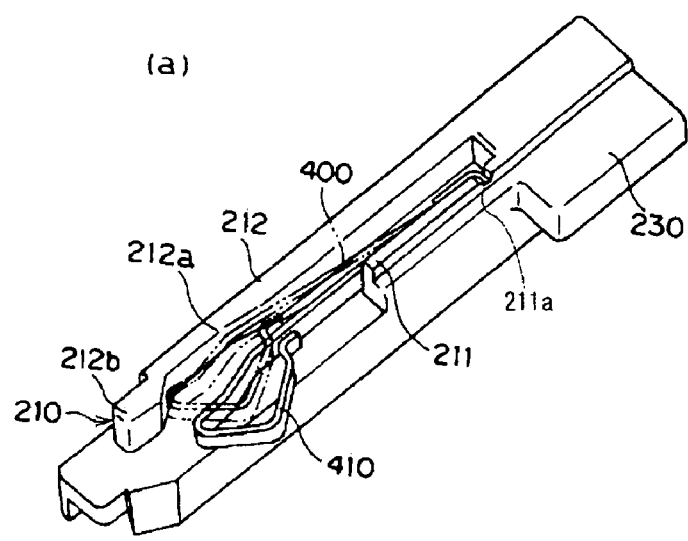
FIG. 5 is a view for explaining the slider of the card connector, in which (a) is a schematic perspective view showing the slider taken from beneath and (b) is a schematic perspective view showing the slider taken from above.
Figure 5:
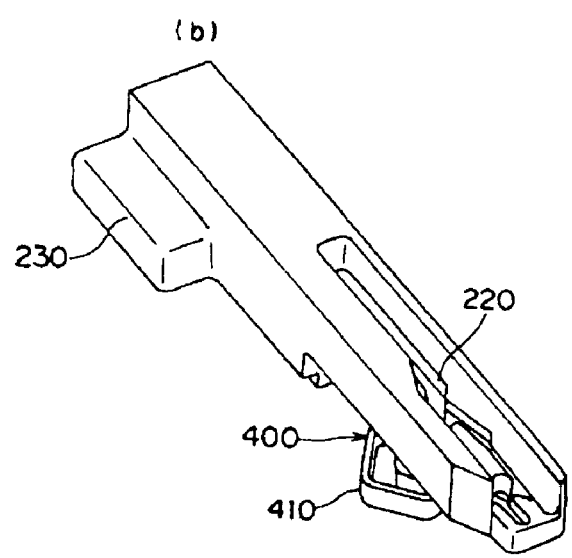

The base 100 is a connector body in which a groove 121 for housing the slider 200, the spring 300 and the lock spring 400 is provided at its one end 120 as shown in FIGS. 2, 3 and 4. In this groove 121, the slider 200 is moved with the card M from a card discharging position ε (refer to FIG. 2) toward a card insertion position β (refer to FIG. 3) against the force of the spring 300 when the slider 200 is pushed by the card M, and it is moved with the card M from the card insertion position β to a card pop-out preventing position α (refer to FIG. 4) beyond the card discharging position ε (refer to FIG. 2) by the force of the spring 300 when the card is discharged.

The groove 121 comprises an opening 121a at one end and a recess 121b at the other end. A supporting member 500 which supports the spring 300 fits in the opening 121a. Meanwhile, a spring 600 (that is, an elastic member) which pushes back the slider 200 from the card pop-out preventing position α to the card discharging position ε when the slider 200 is positioned at the card pop-out preventing position α is provided in the recess 121b. In addition, the spring 600 serves as a buffer member which receives impact generated when the slider 200 is moved from the card insertion position β to the card pop-out preventing position α.

A first rib 130 is provided at an end of an inner wall of the recess 121b facing the sot 110. As shown in FIG. 4, the first rib 130 abuts on the tip end 410 of the lock spring 400 so as to prevent the movement of the tip end 410 when the slider 200 is positioned at the card pop-out preventing position α, which is the characteristic point of the present invention.

In addition, a second rib 140 is provided at the center of the groove 121. As shown in FIG. 3, the second rib 140 abuts on the tip end 410 of the lock spring 400 so as to prevent the movement of the tip end 410 when the slider 200 is positioned at the card insertion position β.

In the slot 110, the base 100 comprises a plurality of contact terminals 150 which come into contact with the plurality of contact terminals 20 of the card M. Thus, the card M is electrically connected to an electronics device (not shown) through these contact terminals 150.

The slider 200 comprises a j-shaped wall 210 on the bottom face of its tip end as shown in FIG. 5(a) and a cam groove 220 constituting a part of a heart cam mechanism on the upper face as shown in FIG. 5(b).

The wall 210 comprises a first wall 211 on which the lock spring 400 is mounted and a second wall 212 opposed to the first wall 211. The second wall 212 is a convex ridge which extends longer than the first wall 211 and comprises a recess 212a for housing the displaced tip end 410, at a position opposed to the tip end 410 of the lock spring 400. In addition, a projection 212b which can be inserted to the recess 121b of the base 100 is provided at a tip end of the second wall 212. A groove 211a which stops the base end 420 of the lock spring 400 is provided in the first wall 211.

The cam groove 220 constitutes the heart cam mechanism together with a pin (not shown). The heart cam mechanism is well-known in the art, which locks the card M in the card insertion position β when the card M inserted in the slot 110 is pushed and cancels the lock when the card is pushed again.

In addition, as shown in FIGS. 2, 3 and 4, a convex part 230 which fits in the recess 30 of the card M is provided on one side face of a rear end of the slider 200. The tip end 410 of the lock spring 400 engages with the engagement recess 10 of the card M in a state where the convex part 230 fits in the recess 30 of the card M (refer to FIG. 1). Thus, the slider 200 can be made to slide with the card M. In addition, a hole 240 in which the spring 300 fits is formed at the rear end of the slider 200.

According to the lock spring 400, its tip end 410 is bent into a convex shape, while its base end 420 is bent into almost an L shape. The base end 420 is stopped by the groove 211a of the first wall 211 of the slider 200, whereby the lock spring 400 is mounted on the slider 200. In this state, as shown in FIG. 2, the tip end 410 of the lock spring 400 is not locked and when the card M abuts on it, it is displaced from an initial position γ to a retreated position δ (that is, in the direction moving away from the card).

The spring 300 is housed in the groove 121 of the base 100 in a state where its one end is inserted into the hole 240 of the slider 200 and the other end is inserted into the supporting member 500 which will be described below. As shown in FIG. 3, the spring 300 shrinks when the slider 200 is positioned at the card insertion position β, whereby it forces the slider 200 to the discharging direction of the card M.

A description will be made of how to use the thus constituted card connector A and each operation of the parts will be described, hereinafter. First, the slider 200 is positioned at the card discharging position ε before the card M is inserted.

Then, the card M is inserted into the slot 110 of the base 100. Thus, the tip end 410 of the lock spring 400 abuts on the recess 30 of the card M, so that the tip end 410 is displaced from the initial position γ to the retreated position δ and fits in the recess 212a of the second wall 212 of the slider 200.

Then, the recess 30 of the card M abuts on the convex part 230 of the slider 200, whereby the slider 200 is slid with the card M from the card discharging position ε to the card insertion position β. At this time, the tip end 410 of the lock spring 400 is displaced from the retreated position δ to the initial position γ and fits in the engagement recess 10 of the card M (refer to FIG. 1).

When the slider 200 is pushed into the card insertion position β, this state is maintained by the heart cam mechanism. At this time, as shown in FIG. 3, the tip end 410 of the lock spring 400 abuts on the second rib 140 and it is prevented from being moved to the retreated position δ. Thus, the tip end of the 410 of the lock spring 400 is maintained in a state where it fits in the engagement recess 10 of the card M.

When the card M is discharged, the state of the heart cam mechanism is unlocked by pushing the card M into the inserting direction. Then, the slider 200 is moved with the card M from the card insertion position β to the card pop-out preventing position α by the force of the spring 300. When the slider 200 is positioned at the card pop-out preventing position α, the tip end 410 of the lock spring 400 abuts on the first rib 130 to be prevented from being moved to the retreated position δ as shown in FIG. 4. That is, the state in which the tip end 410 of the lock spring 400 fits in the engagement recess 10 of the card M is maintained, whereby the card M is prevented from popping out.

In addition, when the slider 200 is positioned at the card pop-out preventing position α, the projection 212b of the slider 200 fits in the recess 121b of the base 100 and abuts on the spring 600. The slider 200 is pushed back from the card pop-out preventing position α to the card discharge position ε together with the card M by the force of the spring 600.

When the slider 200 is positioned at the card discharging position ε, the tip end 410 of the lock spring 400 does not abut on the first rib 130 as shown in FIG. 2. That is, because the tip end 410 of the lock spring 400 can be moved from the initial position γ to the retreated position δ, the card M can be pulled out of the slot 110.

According to the above card connector A, because the tip end 410 of the lock spring 400 abuts on the first rib 130 provided at the base 100 and is prevented from being moved to the retreated position δ when the slider 200 is positioned at the card pop-out preventing position α, so that the state in which the tip end 410 engages with the engagement recess 10 of the card M is maintained. As a result, the card M can be prevented from popping out. Thus, the card M is prevented from being lost or from injuring the face of a user because of popping out when it is discharged, as in the conventional example. In addition, because the card M is not prevented from popping out using friction unlike in the conventional example, the card connector A itself is not likely damaged.

Figure 6:
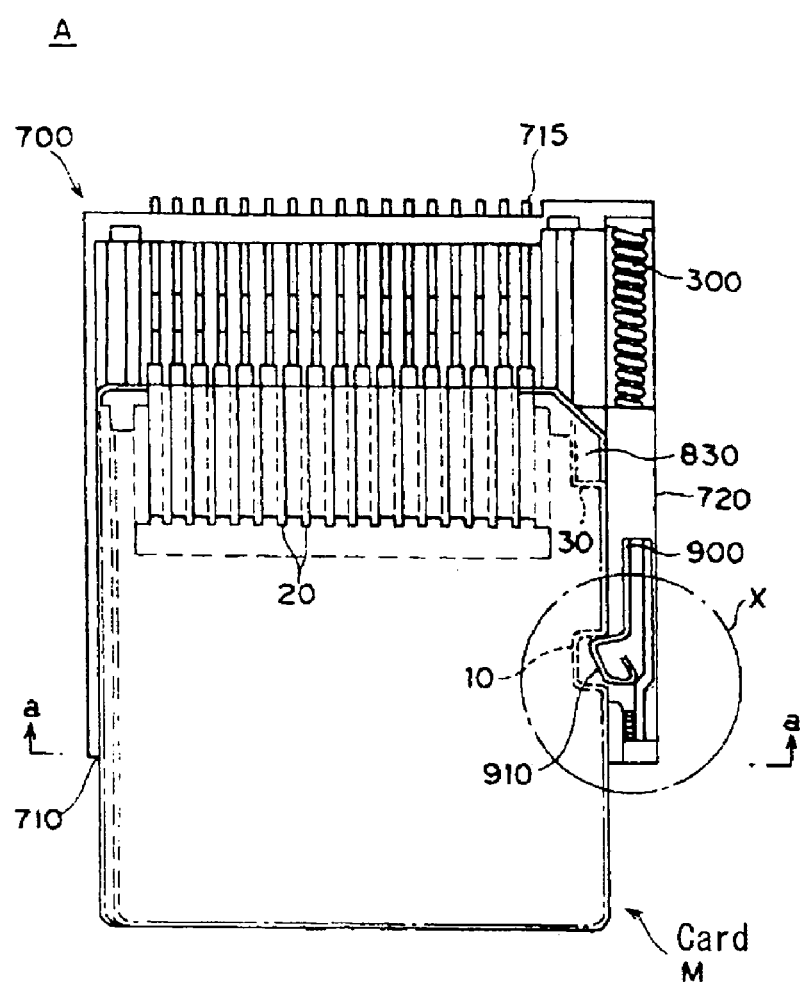
FIG. 6 is a schematic plan view showing a card connector in which its inside is transparent according to an embodiment 2 of the present invention.
Figure 9:
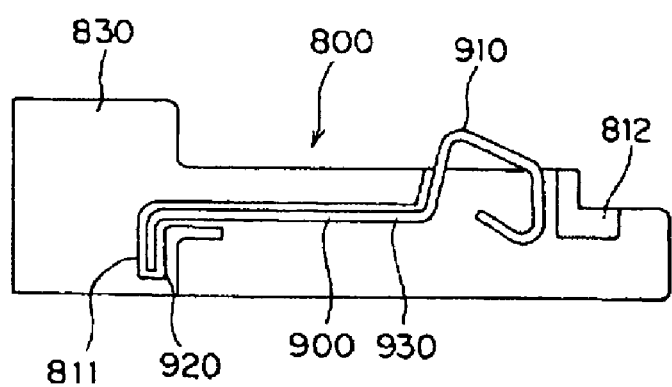
FIG. 9 is a bottom view showing a tip end of the slider on which a lock spring of the card connector is mounted.
Figure 10:
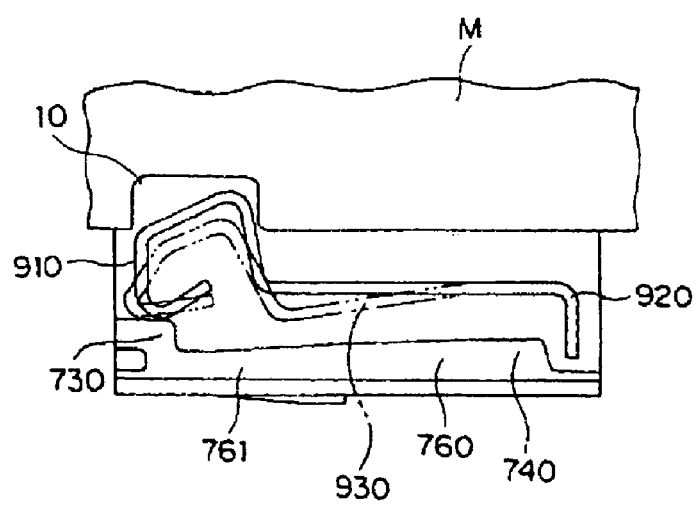
FIG. 10 is an enlarged sectional view showing the part X in a state where the lock spring of the card connector is elastically deformed.

Next, a card connector according to a second embodiment of the present invention will be described with reference to the drawings. FIG. 6 is a schematic plan view showing a card connector in which its inside is transparent according to the embodiment 2 of the present invention, FIG. 7 is a sectional view showing the card connector taken along line a—a when a slider is positioned at a card insertion position, FIG. 8 is an enlarged sectional view showing a part X of the card connector in FIG. 6, in which (a) is a view showing a state when the slider is positioned at the card discharging position, and (b) is a view showing a state when the slider is positioned at a card pop-out preventing position, FIG. 9 is a bottom view showing a tip end of the slider on which a lock spring of the card connector is mounted, and FIG. 10 is an enlarged sectional view showing the part X in a state where the lock spring of the card connector is elastically deformed.

Although a card connector A' has almost the same constitution as the card connector A, the card connector A' is different from the card connector A in configuration of a lock spring 900, configuration of a lower face of a tip end of a slider 800, and configuration of the other end of a groove 721 of a base 700. These different points will be described in detail hereinafter and a description of the same parts will be omitted. In addition, reference numeral 700 designates the base, reference numeral 800 designates the slider, and reference numeral 900 designates the lock spring.

Figure 7:
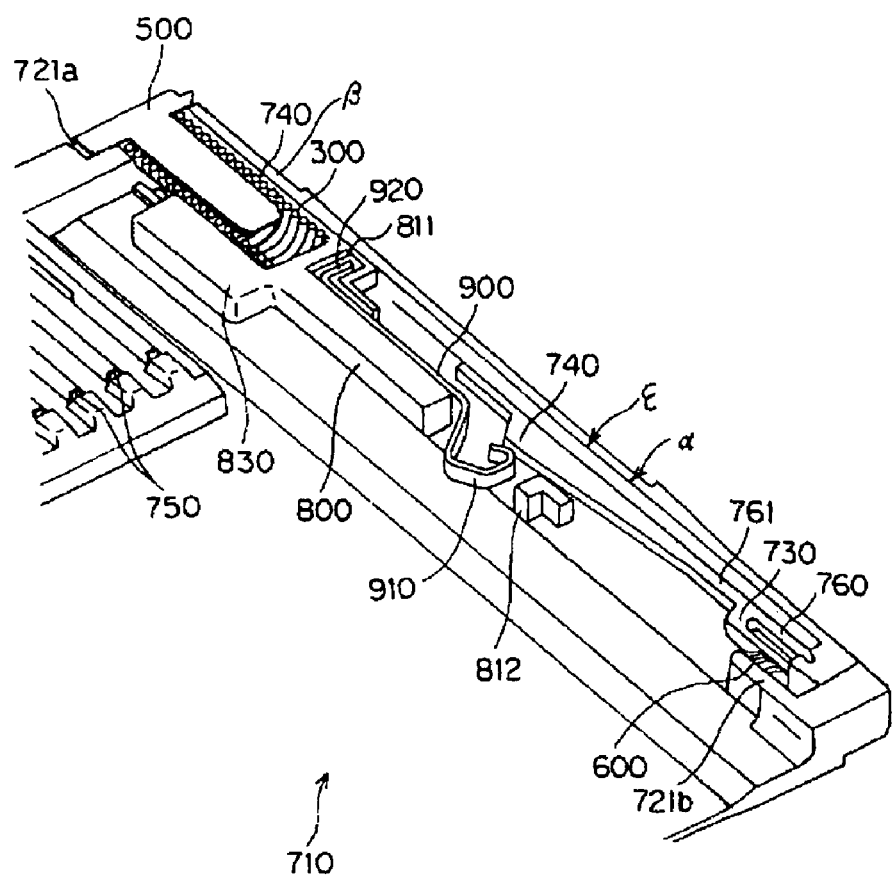
FIG. 7 is a sectional view showing the card connector taken along line a—a when a slider is positioned at a card insertion position.
Figure 8:
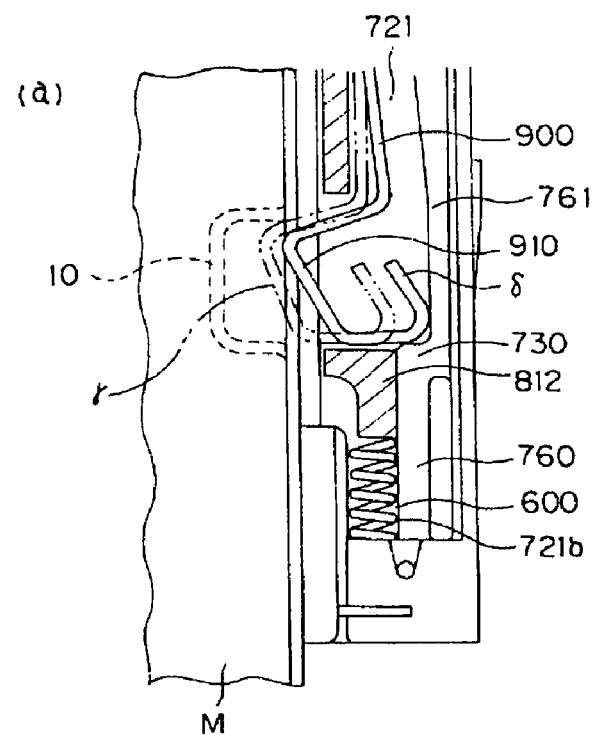
FIG. 8 is an enlarged sectional view showing a part X of the card connector in FIG. 6, in which (a) is a view showing a state when the slider is positioned at the card discharging position and (b) is a view showing a state when the slider is positioned at a card pop-out preventing position.
Figure 8:
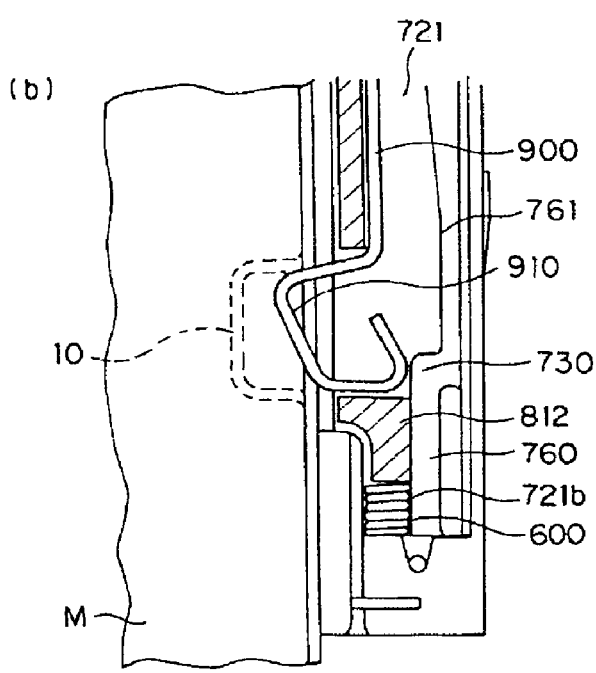

As shown in FIGS. 7 and 8, the base 700 comprises a convex ridge 760 which extends along an inner wall of the groove 721 and is provided at the other end of the groove 721. A corner on which a tip end 910 of the lock spring 900 can abut is provided at an end of the convex ridge 760 on the card discharging side. This corner serves as a first rib 730 and abuts on the tip end 910 of the lock spring 900 when the slider 800 is positioned at a card pop-out preventing position α (refer to FIG. 7) to prevent the tip end 910 of the lock spring 900 from being displaced. In addition, a convex part which protrudes toward the slot 710 is provided at an end of the convex ridge 760 on the card inserted side. This convex part serves as a second rib 740 and abuts on the tip end 910 of the lock spring 900 when the slider 800 is positioned at a card housed position β (refer to FIG. 7) to prevent the tip end 910 of the lock spring 900 from being displaced. Furthermore, a recess 761 in which the tip end 910 of the displaced lock spring 900 fits when the slider 800 is positioned at a card discharging position ε is provided at a middle part between the first rib 730 and the second rib 740 of the convex ridge 760.

In addition, at the other end of the groove 721 of the base 700, a recess 721b is provided on the inner side of the convex ridge 760 (that is, on the side of the slot 710) (refer to FIG. 8). A convex part 812 of the slider 800 is inserted in the recess 721b when the slider 800 is positioned at the card pop-out preventing position α. A spring 600 (that is, an elastic member) for pushing back the slider 800 from the card pop-out preventing position α to the card discharging position ε is housed in the recess 721b.

As shown in FIG. 9, according to the slider 800, an engagement groove 811 formed into almost an L shape with which a base end 920 of the lock spring 900 engages is provided at a base part in a lower face of the tip end on the back side of the sliding direction. In addition, according to the slider 800, the convex part 812 which can be inserted into the recess 761 of the base 700 is provided at a portion in the lower face of the tip end on the front side of the sliding direction so as to be apart from the base (refer to FIGS. 8 and 9).

As shown in FIG. 7, the lock spring 900 is formed such that a linear plate spring is bent like in the first embodiment and comprises an angular hook-shaped tip end 910, an almost L-shaped base end 920 and a liner middle part 930 between the tip end 910 and the base end 920. The lock spring 900 is formed such that the tip end 910 protrudes from a space between the base part and the convex part 812 of the slider 800 toward the slot 710 when the base end 920 engages with the engagement groove 811 of the slider 800 to be mounted on the slider 800. As shown in FIG. 10, when the card M is pulled out in a state where the tip end 910 of the lock spring 900 abuts on the first rib 730, the tip end 910 is pushed toward a wall face of the engagement recess 10 of the card M and then elastically deformed. The middle part 930 is also elastically deformed as the tip end 910 is elastically deformed and it is displaced in the direction away from the slot 710. Thus, the tip end 910 of the lock spring 900 disengages from the engagement recess 10, so that the card M can be taken out.

A description will be made of how to use the thus constituted card connector A' and each operation of the parts will be described, hereinafter.

First, the slider 800 is positioned at the card discharging position ε before the card M is inserted. Then, the card M is inserted into the slot 710 of the base 700. Thus, the tip end 910 of the lock spring 900 abuts on a recess 30 of the card M, so that the tip end 910 is displaced from an initial position γ to a retreated position δ and fits in the recess 761 of the convex ridge 760 of the base 700 (refer to FIG. 8(a)).

Then, the recess 30 of the card M abuts on the convex part 830 of the slider 800, whereby the slider 800 is caused to slide with the card M from the card discharging position ε to a card insertion position β. At this time, the tip end 910 of the lock spring 900 is displaced from the retreated position δ to the initial position γ and fits in the engagement recess 10 of the card M.

When the slider 800 is positioned at the card discharging position ε, the tip end 910 of the lock spring 900 is opposed to the recess 761 of the convex ridge 760 as shown in FIG. 8(a). That is, because the tip end 910 of the lock spring 900 is moved from the initial position γ to the retreated position δ, the card M can be pulled out of the slot 710.

When the slider 800 is pushed into the card insertion position β, this state is maintained by a heart cam mechanism. At this time, the lock spring 900 abuts on the second rib 740 and the tip end 910 of the lock spring 900 is prevented from being moved to the retreated position δ (refer to FIG. 7). Thus, the tip end of the 910 of the lock spring 900 is maintained in a state where it fits in the engagement recess 10 of the card M.

When the card M is discharged, the state of the heart cam mechanism is unlocked by pushing the card M in the inserting direction. Then, the slider 800 is moved with the card M from the card insertion position β to the card pop-out preventing position α by the force of the spring 300. When the slider 800 is positioned at the card pop-out preventing position α, the tip end 910 of the lock spring 900 abuts on the first rib 730 and prevented from being moved to the retreated position δ (refer to FIG. 8(b)). That is, the state in which the tip end 910 of the lock spring 900 fits in the engagement recess 10 of the card M is maintained, whereby the card M is prevented from popping out.

In addition, when the slider 800 is positioned at the card pop-out preventing position α, the convex part 812 of the slider 800 fits in the recess 721b of the base 700 and abuts on the spring 600. Then, the slider 800 is pushed back from the card pop-out preventing position α to the card discharging position ε together with the card M by the force of the spring 600.

When the slider 800 is positioned at the card discharging position ε, the tip end 910 of the lock spring 900 is opposed to the recess 761 of the convex ridge 760 as shown in FIG. 8(a). That is, because the tip end 910 of the lock spring 900 is moved from the initial position γ to the retreated position δ, the card M can be pulled out of the slot 710.

In a case where the card M cannot be taken out of the slot 710 of the base 700 for some reason, when the card M is pulled out in the discharging direction, the slider 800 is moved together with the card M in the discharging direction. Then, the tip end 910 of the lock spring 900 abuts on the first rib 730, while it is pushed toward the wall surface of the engagement recess 10 of the card M as shown in FIG. 10. Thus, the tip end 910 is elastically deformed (refer to FIG. 10) and at the same time, the middle part 930 is also elastically deformed. Thus, the tip end 910 of the lock spring 900 disengages from the engagement recess 10 of the card M, so that the card M can be taken out.

According to this card connector A', when the slider 800 is positioned at the card pop-out preventing position α, the tip end 910 of the lock spring 900 abuts on the first rib 730 provided at the base 700, so that it is prevented from being moved to the retreated position δ and the state in which the tip end 910 engages with the engagement recess 10 of the card M is maintained. As a result, the card M is prevented from popping out. Thus, the card M is prevented from being lost or from injuring the face of a user because it pops out when it is discharged unlike in the conventional example. In addition, because the card M is not prevented from popping out using the friction like in the conventional example, the card connector A itself is not likely to be damaged. In addition, when the card M is pulled in case of some trouble, because the tip end 910 of the lock spring 900 is elastically deformed and disengages from the engagement recess 10 of the card M, the card M is not stuck in the slot 710.

Any modification can be made in designing each of the card connectors A and A' to which the card having the engagement recess on at least one side face is inserted, as long as each comprises a base having a slot to which the card can be inserted, a slider which is provided at a position so that it can abut on the card in the base and can be moved together with the card from the card pop-out preventing position to the card insertion position, a spring which holds the slider at the card discharging position between the card pop-out preventing position and the card insertion position and forces the slider in the card discharging direction when the slider is positioned at the card insertion position, and a lock spring comprising a plate spring in which a tip end can engage with an engagement recess of the card, a base end is mounted on the slider, and the tip end can be displaced in the direction away from the card, and there is provided a first rib which abuts on the tip end of the lock spring to prevent the tip end from being displaced, in the base when the slider is positioned at the card pop-out preventing position.

According to the bases 100 and 700, as long as at least first ribs 130 and 730 are provided, respectively, they may have any configuration.

In addition, according to the sliders 200 and 800, although they can be maintained at the card insertion position β by the heart cam mechanism in the above embodiment, any other locking mechanism can be used.

The lock spring 400 can have any configuration as long as the tip end 410 can engage with the engagement recess 10 of the card M. In addition, although the tip end 910 of the lock spring 900 is in the shape of hook in the above embodiment, the present invention is not limited to this, and the lock spring 900 can have any configuration as long as the tip end 910 can be elastically deformed so as to disengage from the engagement recess 10 of the card M while it abuts on the first rib 730. In addition, although the tip end 910 of the lock spring 900 can be elastically deformed while it abuts on the first rib 730, it is needless to say that the tip end 410 of the lock spring 400 can be elastically deformed so as to disengage from the engagement recess 10 of the card M while it abuts on the second rib 740. However, a length of the slot 710 of the base 700 has to be shorter than that of the card M (that is, the card M has to be partially housed in the slot 710) so that the card M which is stuck at the card insertion position β can be pulled out by a user. Thus, even if the card M is stuck at the card insertion position β for some reason, the card M can be easily taken out.

According to the spring 600, any elastic member can be used as long as it abuts on the tip end of the slider 200 to return the slider 200 from the card pop-out preventing position α to the card discharging position δ when the slider 200 is positioned at the card pop-out preventing position α. Therefore, a rubber and the like can be used.

In addition, when the engagement recess 10 is formed on each side face of the card M, the grooves 121 and 721 which house the sliders 200 and 800, the spring 300, the lock springs 400 and 900 and the like are formed on both ends of the base 100 and 700, and at least the first ribs 130 and 730 are provided, respectively.

The invention claimed is:

1. A card connector for receiving a card having an engagement recess on at least one side face, comprising:
   a base having a slot into which the card can be inserted;
   a slider provided at a position in the base to be abuttable on the card;
   a spring forcing the slider in a discharging direction of the card; and
   a lock spring comprising a plate spring having a tip end engageable with the engagement recess of the card and a base end mounted on the slider, the tip end displaceable in a direction away from the card,
   wherein said slider is pushed by the inserted card and thereby is moved along with the card from a card discharging position to a card insertion position against an urging force of the spring while, upon discharge of the card, the slider is moved along with the card by the urging force of said spring from the card insertion position to a card pop-out preventing position beyond the card discharging position, and
   said base is provided with a first rib which abuts the tip end of the lock spring to prevent the tip end from being displaced in a direction away from the card when the slider is positioned at the card pop-out preventing position.

2. The card connector according to claim 1, wherein said base is provided with a second rib which abuts said tip end of the lock spring to prevent the tip end from being displaced when said slider is positioned at the card insertion position.

3. The card connector according to claim 1, wherein said base is provided with an elastic member which abuts a tip end of said slider to return the slider from the card pop-out preventing position to the card discharging position when the slider is positioned at the card pop-out preventing position.

4. The card connector according to claim 1 or 2, wherein said tip end of the lock spring can be elastically deformed so as to disengage from said engagement recess of the card when it abuts at least said first rib.

* * * * *